Figure 1:
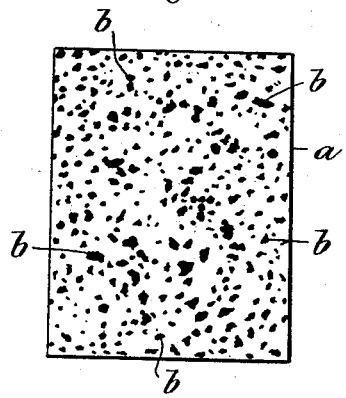

No. 660,809.  
F. K. CHEESE.  
METHOD OF MAKING TILES.  
(Application filed Aug. 6, 1900.)  
Patented Oct. 30, 1900.

(No Model.)

Witnesses  
Inventor  
Frank K. Cheese

UNITED STATES PATENT OFFICE.

FRANK K. CHEESE, OF LONDON, ENGLAND.

METHOD OF MAKING TILES.

SPECIFICATION forming part of Letters Patent No. 660,809, dated October 30, 1900.

Application filed August 6, 1900. Serial No. 26,046. (No specimens.)

*To all whom it may concern:*

Be it known that I, FRANK KINDER CHEESE, engineer, a subject of the Queen of Great Britain, residing at 19 Beechdale road, Brixton Hill, London, in the county of Surrey, England, have invented certain new and useful Improvements in Processes of Making Glass Tiles, of which the following is a specification.

This invention relates to improved means for preparing the backs of glass tiles to admit of their being fixed by cement to the surfaces of walls and the like for internal and external decoration.

Heretofore the backs of glass tiles have been first coated over with a fusible vitreous paste, and all over this sand or glass granules have been sprinkled. The tiles have then been submitted to heat, which fuses the paste and causes the granules to adhere to the glass. In this way the entire surface of the back of the tile has been covered with material to which the cement used for fixing the tiles to the surface of walls or the like will adhere, and consequently when the tiles are being set they are frequently broken by the expansion or contraction of the cement used.

According to my invention I attach, as hereinafter described, small lumps or granules to the back of the glass, while at the same time leaving the surface of the glass in the spaces between the lumps or granules entirely uncovered, so that at these parts the cement will not adhere and so freedom is given for the cement to expand or contract without breaking the glass. To effect this, in place of using granules of sand or glass, as heretofore, I form small lumps or granules of a mixture which is held cemented together by gum or the like and is composed of sand, powdered asbestos, or the like and matters which when exposed to heat will fuse together. The lumps or granules may advantageously be composed of a mixture of sand, powdered or divided asbestos, oxid of lead, borax, and gum in the proportion, say, of about two parts of sand, two parts of asbestos, one part of oxid of lead, one-fourth part of borax, and one-sixteenth part of gum. The gum should first be dissolved in water and the other materials then admixed with it to form a stiff dough, which hardens when allowed to dry, and when dry it can be crushed into granules of the required size. Such crushed granules being irregular in shape, will in the majority of cases when attached to the back of the glass present some undercut surface for the cement by which the glass is subsequently to be fixed in place to lay hold of; but the same result can be obtained by forming the dough, before it is allowed to dry, into small lumps or granules of globular form or molding it into small lumps or granules of other shape, which will insure that in whatever position they rest on the glass they shall present some undercut surface or surfaces. In applying these granules to the back of the glass the surface of the glass, which may be either plain or colored, is first damped with clean water and the small lumps or granules of the mixture are sprinkled over it. The gum which they contain then causes them to adhere to the glass, each granule being self-affixing. The glass is then fired. In a few minutes the fusible materials in the lumps or granules fuse together and the lumps or granules become securely attached to the glass. The glass may then be removed from the heat and allowed to cool slowly.

The annexed drawings show a glass tile made in accordance with this invention.

Figure 2:

Figure 1 is a back view, and Fig. 2 is a section made to an enlarged size.

*a* is the tile, and *b* the small lumps or granules.

What I claim is—

1. The hereinbefore-described process of manufacturing a glass tile with roughened back by moistening the back of the tile, dropping onto it small lumps formed from a mixture held together by cementing material and composed of finely-divided infusible solid material admixed with materials which will fuse together and unite with the surface of the glass, and then heating the glass to fuse the fusible material in the lumps, substantially as set forth.

2. The hereinbefore-described process of manufacturing a glass tile with roughened back by moistening the back of the tile, dropping onto it small lumps formed from a mixture held together by cementing material and composed of finely-divided infusible solid material admixed with materials which will fuse with it and with the surface of the glass, and then heating the glass to fuse the fusible material in the lumps substantially as set forth.

3. The hereinbefore-described process of manufacturing a glass tile with roughened back, consisting in first admixing granular material such as sand with materials which will fuse when heated and with a cementing solution, allowing the mixture to harden, crushing the mixture after it has become hard into small lumps, moistening the back of the sheet of glass to be coated, sprinkling the lumps over the moistened back and then heating the glass to fuse the fusible material in the lumps substantially as set forth.

4. The hereinbefore-described process of manufacturing a glass tile with roughened back by moistening the back of the tile, dropping on it lumps composed partly of materials which will fuse together and to the glass and partly of cementing material which will adhere to the moistened back of the glass, and then heating the glass to fuse the fusible material in the lumps substantially as set forth.

5. The hereinbefore-described process of manufacturing a glass tile with roughened back by moistening the back of the tile, dropping onto it lumps composed of a mixture of sand, asbestos, oxid of lead, borax and gum, and then heating the glass to fuse the fusible material in the lumps.

FRANK K. CHEESE.

Witnesses:
WALTER J. SKERTEN,
FREDK. C. WEATHERBY.